(12) United States Patent
Narimatu

(10) Patent No.: US 10,782,642 B2
(45) Date of Patent: Sep. 22, 2020

(54) IMAGE FORMING APPARATUS, IMAGE FORMING SYSTEM, MANAGEMENT APPARATUS, AND NON-TRANSITORY COMPUTER READABLE RECORDING MEDIUM STORING PROGRAM

(71) Applicant: Konica Minolta, Inc., Chiyoda-ku, Tokyo (JP)

(72) Inventor: Eiichi Narimatu, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 179 days.

(21) Appl. No.: 15/937,635

(22) Filed: Mar. 27, 2018

(65) Prior Publication Data

US 2018/0335742 A1 Nov. 22, 2018

(30) Foreign Application Priority Data

May 19, 2017 (JP) .................................. 2017-100324

(51) Int. Cl.
*G03G 15/00* (2006.01)
*G06T 7/00* (2017.01)

(52) U.S. Cl.
CPC ......... *G03G 15/55* (2013.01); *G03G 15/5062* (2013.01); *G03G 15/6517* (2013.01); *G06T 7/0002* (2013.01); *G06T 7/0004* (2013.01); *G06T 2207/30144* (2013.01)

(58) Field of Classification Search
CPC ............... G03G 15/55; G03G 15/6517; G03G 15/5062; G03G 15/5016; G06T 7/0004; G06T 7/0002; G06T 2207/30144
See application file for complete search history.

(56) References Cited

U.S. PATENT DOCUMENTS

2008/0290578 A1\* 11/2008 Ebihara .................... B26D 5/34
270/5.02

FOREIGN PATENT DOCUMENTS

| JP | 2008-221637 A | | 9/2008 |
| JP | 2008221637 A | \* | 9/2008 |
| JP | 2014-144627 A | | 8/2014 |

(Continued)

OTHER PUBLICATIONS

Notification of Reasons for Refusal dated Oct. 1, 2019, in Japanese Patent Application No. 2017-100324, 19 pages.

(Continued)

*Primary Examiner* — Susan S Lee
(74) *Attorney, Agent, or Firm* — Squire Patton Boggs (US) LLP

(57) ABSTRACT

An image forming apparatus includes: an image forming unit configured to form an image on a continuous transfer medium based on a job; a controller configured to control the image forming unit, the controller having a function to cause the image forming unit to print information indicating a position mark which represents a position at least in a longitudinal direction of the continuous transfer medium on the continuous transfer medium and a function to acquire a result of reading of an image on the continuous transfer medium and determine a quality of the image on the continuous transfer medium based on the result of reading, wherein when an image is determined to be defective on the transfer medium having the position mark printed thereon, information on the position mark of the image determined to be defective is notified.

19 Claims, 10 Drawing Sheets

(56) References Cited

FOREIGN PATENT DOCUMENTS

JP    2014144627 A  *  8/2014
JP    2016-124236      7/2016

OTHER PUBLICATIONS

Examiner's Decision of Refusal dated Dec. 10, 2019, in Japanese Patent Application No. 2017-100324, 6 pages.
First Chinese Office Action for Chinese Application No. 201810479207.X, with English translation, 22 pages, dated Jun. 19, 2020.

* cited by examiner

IMAGE FORMING APPARATUS, IMAGE FORMING SYSTEM, MANAGEMENT APPARATUS, AND NON-TRANSITORY COMPUTER READABLE RECORDING MEDIUM STORING PROGRAM

The entire disclosure of Japanese patent Application No. 2017-100324, filed on May 19, 2017, is incorporated herein by reference in its entirety.

BACKGROUND

Technological Field

The present invention relates to an image forming apparatus, an image forming system, a management apparatus, and a non-transitory computer-readable recording medium storing a program capable of determining the quality of images based on results of reading of images formed on a continuous transfer medium.

Description of the Related Art

Examples of a known image forming apparatus configured to form images on continuous paper such as a roll paper include an image forming apparatus provided with a feeder specific for roll paper at a paper feeding part and a device configured to roll up the roll paper at a paper discharging part.

For example, Japanese Patent Laid-Open No. 2016-124236 discloses a printing apparatus including a paper feeding device configured to store and hold a roll RO of continuous label paper S and feeding the label paper S to a downstream side in a paper conveying direction, and a winding device configured to wind and hold the continuous paper discharged therefrom.

In a field of the image forming apparatus including copying machines, printers, and multifunctional machines, determination of abnormalities of images and adjustment of the image quality are performed based on results of reading of images on paper. For example, there is a known apparatus in which a read printed image and image data for printing are compared with each other, and when the read printed image does not match the image data for printing, it is determined as abnormality, or an adjustment image is printed on insert sheet or in an area out of a trim line of paper and the printed image is read to adjust the image quality. In reading the adjustment image, it is possible to determine that an image is abnormal when the adjustment cannot be made. When an image is determined to be abnormal, it is judged to be a defect, and normally, output is stopped. However, stopping the output lowers productivity, and thus continuous output without stopping is desired even after the defect is detected. Therefore, in the related art, when a defect is detected, paper having defects (hereinafter, referred to as "waste paper") are discharged to a destination different from that of normal paper, or the waste paper is discharged with offset to the normal paper.

However, when a continuous paper is used for printing, determination of the quality of images having been read is performed on the totally continuing sheet, and thus sorting of the paper after detection of defects depending on the quality of images is not possible. Therefore, when a defect is detected, an operation to stop printing and remove a defective portion is necessary.

In contrast, in order to enhance productivity, continuing printing is desired even when a defect is detected. However, continuing printing even after the detection of the defect leads to necessity of an additional process to find defective portions, and an operator cannot find the defective portions easily. For example, a person in charge of inspection needs to search for the defective portions from the beginning of the continuous paper in an inspection process, which means that defect information extracted by the determination of defects is not effectively utilized.

SUMMARY

In view of such circumstances, it is an object of the present invention to provide an image forming apparatus, an image forming system, a management apparatus, and a non-transitory computer-readable recording medium storing a program which allow an operator to know positions of defective images easily, if any, on a continuous transfer medium.

To achieve at least one of the abovementioned objects, according to an aspect, an image forming apparatus reflecting one aspect of the present invention includes: an image forming unit configured to form an image on a continuous transfer medium based on a job; a controller configured to control the image forming unit, the controller having a function to cause the image forming unit to print information indicating a position mark which represents a position at least in a longitudinal direction of the continuous transfer medium on the continuous transfer medium and a function to acquire a result of reading of an image on the continuous transfer medium and determine a quality of the image on the continuous transfer medium based on the result of reading, wherein when an image is determined to be defective on the transfer medium having the position mark printed thereon, information on the position mark of the image determined to be defective is notified To achieve at least one of the abovementioned objects, according to an aspect, an image forming system reflecting one aspect of the present invention includes:

an image forming unit configured to form an image on a continuous transfer medium based on a job;

an image reader positioned on a downstream side of the image forming unit in a conveying direction and configured to read the image on the continuous transfer medium; and a controller configured to control the image forming unit and the image reader, the controller having a function to cause the image forming unit to print information indicating a position mark which represents a position at least in a longitudinal direction of the continuous transfer medium and a function to acquire a result of reading of an image on the continuous transfer medium and determining a quality of the image on the continuous transfer medium based on the result of reading, wherein when an image is determined to be defective on the transfer medium having the position mark printed thereon, information on the position mark of the image determined to be defective is notified.

To achieve at least one of the abovementioned objects, according to an aspect, a management apparatus reflecting one aspect of the present invention is a management apparatus configured to manage an image reader configured to read an image on a continuous transfer medium, including:

a management controller configured to control the image reader, the management controller having a function to acquire a result of reading of the image on the continuous transfer medium and determine a quality of the image on the continuous transfer medium based on the result of reading, wherein when an image is determined to be defective on the transfer medium having the position mark printed thereon, information on the mark indicating the position of the image determined to be defective is notified.

To achieve at least one of the abovementioned objects, according to an aspect, a non-transitory computer readable recording medium storing a program reflecting one aspect of the present invention is a non-transitory computer readable recording medium storing a program to be executed by a computer configured to control an image forming unit configured to form an image on a continuous transfer medium and an image reader configured to read the image on the continuous transfer medium, the program causing the computer to execute issuing a command to print information indicating a position mark which represents a position at least in a longitudinal direction of the continuous transfer medium on the continuous transfer medium by the image forming unit, acquiring a result of reading of the image read by the image reader to determine a quality of the image, and when image is determined to be defective when the quality of the image is determined, notifying the information on a mark indicating a position of the image determined to be defective.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
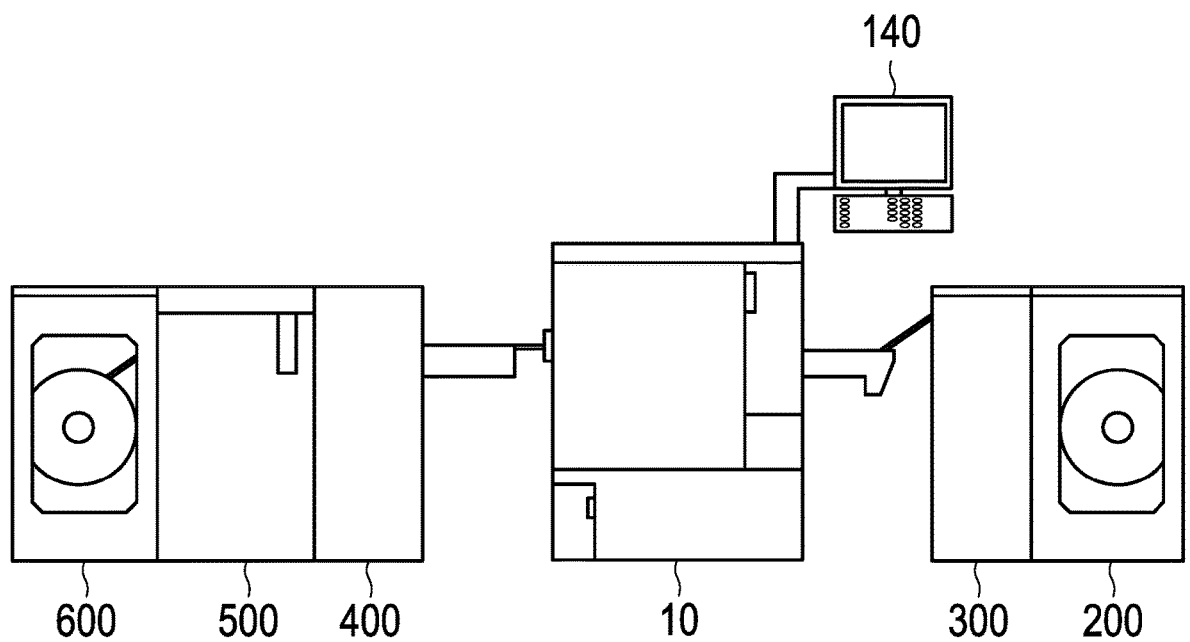
FIG. 1 is a schematic diagram illustrating a configuration of an image forming apparatus according to an embodiment of the present invention.

Hereinafter, an embodiment of the present invention will be described with reference to the drawings. However, the scope of the invention is not limited to the disclosed embodiments.

Referring now to the drawings, an image forming apparatus according to an embodiment of the present invention will be described below.

FIG. 1 is a schematic diagram illustrating a configuration of the image forming apparatus 1.

The image forming apparatus 1 includes a paper feed unit 200 configured to feed roll paper along a paper conveying direction, a paper feed adjustment unit 300 configured to adjust feeding of the roll paper, an apparatus body 10 configured to form an image on the roll paper, a paper discharge adjustment unit 400 configured to adjust discharge of the roll paper, an image reading apparatus 500 configured to read an image on the roll paper, and a paper discharging unit 600 configured to wind and store the roll paper. The respective units are electrically and mechanically connected to allow communication and paper conveyance among units.

The roll paper corresponds to a continuous transfer medium of the present invention. The roll paper also may include a label sheet having a label with adhesive agent adhered to a backing sheet. The material of the continuous transfer medium of the present invention is not limited to paper, and medium formed of fabric or plastic is also applicable. The continuous transfer medium is not limited to those fed from a rolled form, and any continuous transfer medium is applicable. For example, a continuous transfer medium folded alternately is also applicable.

In this embodiment, the image forming apparatus that includes the image reading apparatus has been described. However, a configuration of an image forming system including the image forming apparatus as an apparatus body and the image reading apparatus and the like connected to the apparatus body is also applicable. In addition to the image forming apparatus and the image reading apparatus being in mechanically online, those in mechanically offline are also applicable. In the mechanically offline configuration, the image forming apparatus and the image reading apparatus can be connected electrically, and alternatively, a configuration in which the image forming apparatus and the image reading apparatus are connected electrically to a management apparatus described later is also applicable.

Figure 2:
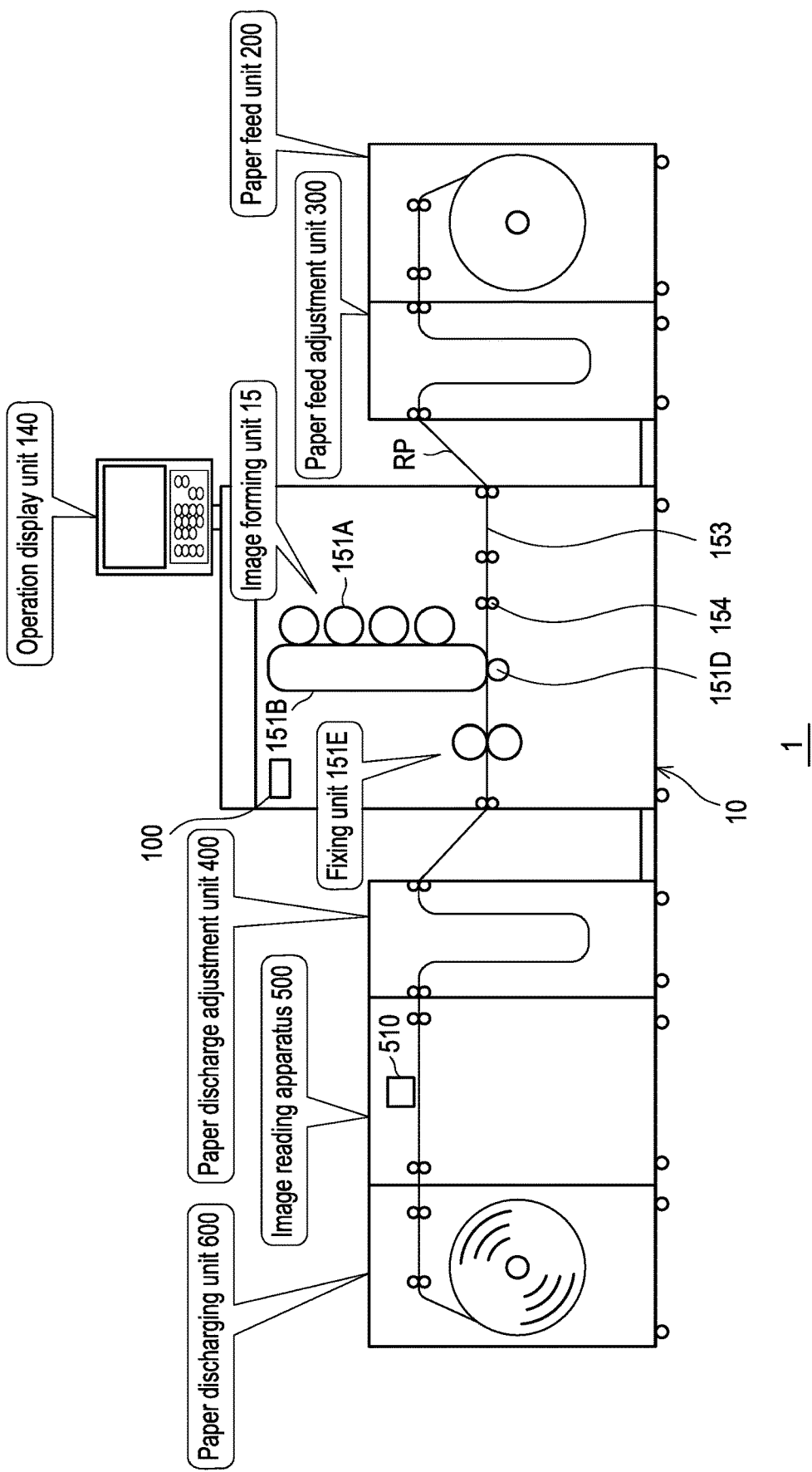
FIG. 2 is a schematic diagram illustrating a mechanical configuration of the image forming apparatus.

Referring now to FIG. 2, a mechanical configuration of the image forming apparatus 1 will be described.

The image forming apparatus 1 includes the paper feed unit 200, the paper feed adjustment unit 300, the apparatus body 10, the paper discharge adjustment unit 400, the image reading apparatus 500, and the paper discharging unit 600 as described above.

The image forming apparatus 1 includes a conveying route 153 through which the roll paper RP is conveyed from the paper feed unit 200 to the paper discharging unit 600 throughout. Provided along the conveying route 153 are conveying rollers 154 configured to convey the roll paper RP through the entire length of the conveying route 153. The conveying rollers 154 are operated by a drive mechanism such as a motor, which is not illustrated.

The paper feed unit 200 is configured to store the roll paper RP and feed the paper in a continuous manner. The roll paper stored in the paper feed unit 200 is conveyed to the paper feed adjustment unit 300 disposed downstream in the sheet conveying direction, and then an image is formed thereon in the apparatus body 10.

The paper feed adjustment unit 300 is configured to adjust the state of conveyance of the roll paper RP conveyed into the apparatus body 10 and serves to absorb a difference in speed of conveyance of the roll paper RP and correct biasing of the roll paper between the paper feed unit 200 and the apparatus body 10, for example.

The apparatus body 10 is provided with an image forming unit 15 at a position close to the conveying route 153.

The image forming unit 15 includes photo conductors 151A prepared for respective colors (cyan, magenta, yellow, black, etc.) and each of the photo conductors 151A includes in a periphery thereof a charger configured to charge a surface of the photo conductor 151A, an LD configured to form a latent image on the charged photo conductor, a developer configured to develop the latent image on the photo conductor by toner, and a cleaning member configured to remove the toner remaining on the photo conductor. The image forming unit 15 also includes an intermediate transfer belt 151B positioned in contact with the photo conductors 151A for the respective colors, and images formed on the photo conductors 151A for respective colors are transferred to the intermediate transfer belt 151B. The images transferred to the intermediate transfer belt 151B are transferred to the roll paper RP by a secondary transfer unit 151D positioned on a side opposite from the intermediate transfer belt 151B with respect to the roll paper RP.

A fixing unit 151E is provided downstream of the secondary transfer unit 151D. The fixing unit 151E is configured to fix the images on the roll paper RP by applying heat and pressure to the roll paper RP.

In this embodiment, the image forming unit 15 forms images on paper by an electrophotographic method. However, image formation of the present invention does not have to be of the electrophotographic method, and inkjet type image formation is also applicable.

In this embodiment, description is given on the assumption that the image forming apparatus is a color printer. However, the present invention is not limited thereto, and an image forming apparatus capable of printing only in one color, such as a monochrome printer is also applicable.

The apparatus body 10 also includes an operation display unit 140 on the top of a housing. The operation display unit 140 includes an LCD configured to display information and an operation key group such as a numeric keypad and serves to display information and receive manipulated inputs. The operation display unit 140 of a type including the display unit and an operating unit integrated into one piece like an LCD having a touch panel is also applicable.

The apparatus body 10 includes a control unit 100 configured to control the image forming apparatus 1 as a whole. The control unit 100 includes a CPU, programs operated by the CPU, and a memory. Hardware of the control unit 100 corresponds to a computer in which programs of the present invention are executed.

The paper discharge adjustment unit 400 is configured to adjust conveyance of the roll paper RP discharged from the apparatus body 10 to absorb a difference in speed of conveyance between the apparatus body 10 and the image reading apparatus 500 and correct biasing of the roll paper.

The image reading apparatus 500 includes an image reading unit 510 configured to read images on the roll paper RP. The image reading unit 510 includes a line sensor such as a CCD sensor and a CMOS sensor. However, the present invention is not particularly limited thereto as long as reading of the images on the paper is achieved. The image reading unit 510 corresponds to the image reader of the present invention. A configuration of the image reading apparatus 500 including a plurality of image reading units is also applicable.

The paper discharging unit 600 winds and stores the roll paper discharged from the image reading apparatus 500.

In the present embodiment, the image reading apparatus 500 is provided downstream of the apparatus body 10 and the images are read in the image reading unit 510 of the image reading apparatus 500. However, in the present invention, the position of the image reader is not specifically limited as long as reading of the images on the roll paper after the image formation is achieved. For example, a configuration including the image reader provided at a position downstream of the image forming unit in the interior of the apparatus body 10 and a configuration including the image reader provided in the paper discharge adjustment unit 400 are both applicable.

A functional block of the image forming apparatus 1 will be described below.

Figure 3:
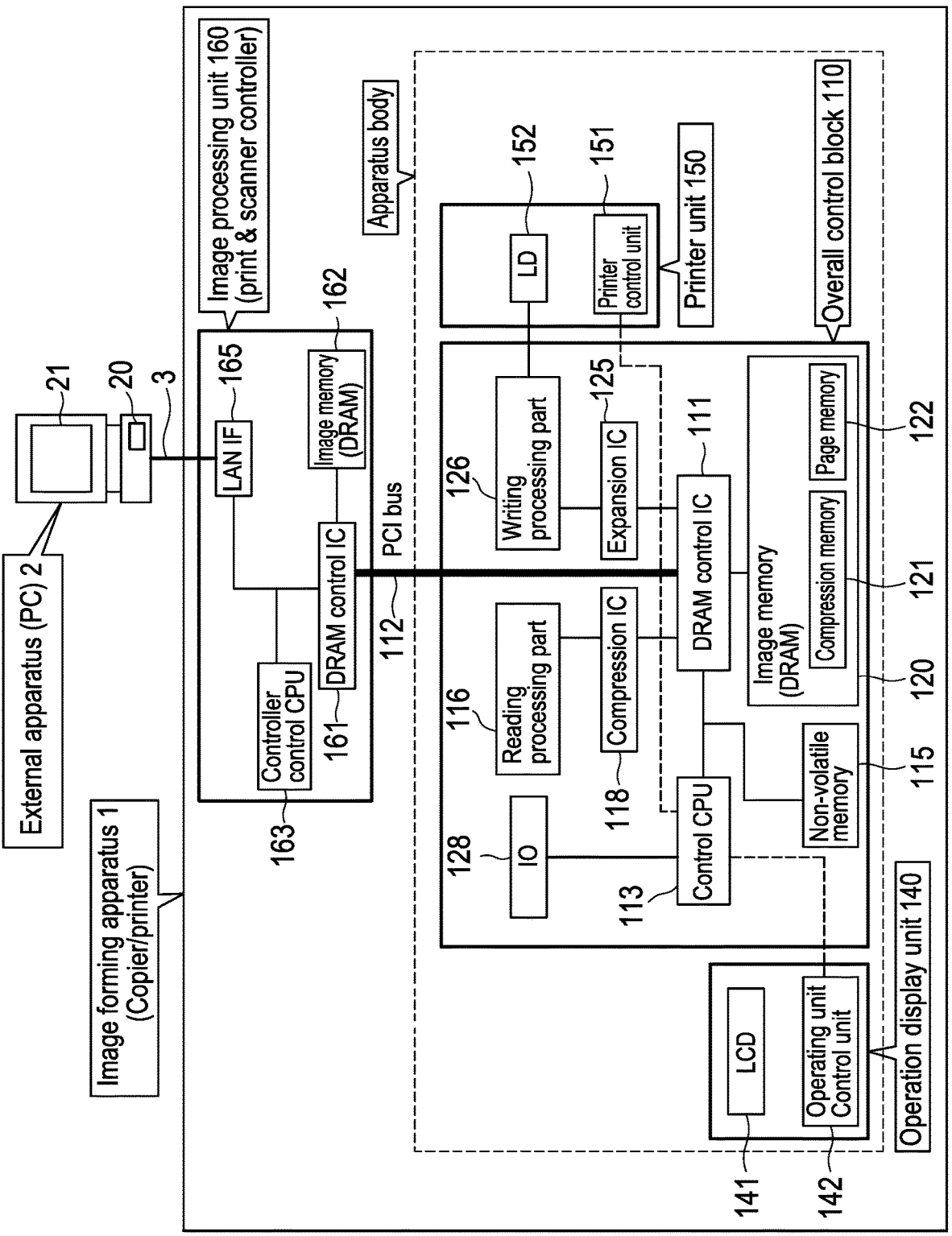
FIG. 3 is a diagram illustrating functional blocks of the image forming apparatus.

FIG. 3 is a diagram illustrating a functional block of the image forming apparatus 1. In FIG. 3, the functional blocks of the image forming apparatus other than the apparatus body 10 are omitted.

The image forming apparatus 1 principally includes an overall control block 110, the operation display unit 140, a printer unit 150, and an image processing unit (print & scanner controller) 160.

The overall control block 110 includes a PCI bus 112. A DRAM control IC 111 is connected to the PCI bus 112.

An image memory 120 is connected to the DRAM control IC 111. The image memory 120 includes a compression memory 121 and a page memory 122. The compression memory 121 is a memory for storing job management information and compressed image data such as originals, and the page memory 122 is a memory for temporarily storing non-compressed image data to be printed before image formation.

The overall control block 110 is provided with a control CPU 113. The control CPU 113 is connected to the DRAM control IC 111.

A non-volatile memory 115 is connected to the control CPU 113. The non-volatile memory 115 stores programs to be executed by the control CPU 113, set data for the image forming apparatus, and process control parameters including image formation conditions.

Programs, various parameters and the like for operating respective units of the image forming apparatus 1, as well as machine set information such as process control parameters, user setting values, and programs for causing the control CPU 113 to execute predetermined operations are also stored in the non-volatile memory 115 in a readable manner. The programs include those provided from the outside and stored in a non-volatile memory or an HDD.

The control CPU 113 is capable of reading the non-volatile data stored in the non-volatile memory 115, and is also capable of writing desired data as non-volatile data in the non-volatile memory 115. The control CPU 113 controls operations of the respective units of the image forming apparatus 1 according to the set data and the like.

The control CPU 113 controls the entire image forming apparatus 1, and constitutes the controller of the present invention together with the non-volatile memory 115, the programs stored in the non-volatile memory 115 and the like.

The control CPU 113 performs control of acquisition of image data and output of image, as well as control of the image reading unit 510 in the image reading apparatus 500, acquisition of machine information of the image forming apparatus and the like.

The control CPU 113 also performs an operation for printing information, which is rough guides of positions in the roll paper, on the roll paper, an operation for determining the quality of the images on the paper based on the image data obtained by reading the images on the paper and image data for printing, and when the image is determined to be defective, an operation for notifying the defects. These operations are executed by the programs.

An IO 128 is connected to the control CPU 113. The control CPU 113 is capable of acquiring signals of respective sensors in the image forming apparatus 1 via the IO 128.

The control CPU 113 is capable of acquiring a result of reading acquired by the image reading unit 510 via the IO 128. The control CPU 113 then compares the acquired result of reading and image data for printing to determine the quality of the image formed on the paper. The methods of determining the quality include any known method such as a pattern matching method, and the method in the present invention is not specifically limited.

The operation display unit 140 includes an LCD 141 having a touch panel and an operating unit control unit 142 configured to control the operating unit as a whole. The operation display unit 140 serves as an operating unit and the display of the present invention. The operating unit control unit 142 is connected to the control CPU 113 so as to allow a serial communication.

The operation display unit 140 allows setting of the respective units of the image forming apparatus 1, and the control CPU 113 controls image formation, conveyance of paper, post process, and the like based on the setting. The operation display unit 140 also allows for setting input of mechanical setting such as print setting or operation control conditions, setting related to output and the like, setting of paper information (size, type of paper) on respective paper feed trays, setting of output mode (for example, normal copy mode, confirmation copy mode), and setting of whether to perform the image quality determination or not and the determination level in the image forming apparatus 1. The operation display unit 140 also enables setting of whether to print the information, which roughly indicates positions in the roll paper, on the roll paper or not, setting of a method to be employed when there are a plurality of rough guides of positions, and setting of a method of notification and contents of notification when waste paper is generated.

The operation display unit 140 allows for display of desired information, such as display of contents and display of notification.

A CCD, not illustrated, is connected to the reading processing part 116, and a compression IC 118 is connected to the reading processing part 116, and the compression IC 118 is connected to the DRAM control IC 111. The reading processing part 116 is configured to process image data read by the CCD, and the compression IC 118 is configured to compress the image data.

An expansion IC 125 is connected to the DRAM control IC 111, and a writing processing part 126 is connected to the expansion IC 125. The writing processing part 126 is connected to an LD 152 (laser diode) of the printer unit 150. The expansion IC 125 is configured to expand the compressed image data, and the writing processing part 126 is configured to process writing data used for an operation of the LD 152.

The printer unit 150 includes a printer control unit 151. The printer control unit 151 is configured to control the printer unit 150 as a whole (paper feed, image formation, paper discharge, post process and the like), and is connected to the control CPU 113. The printer control unit 151 operates in accordance with a control command from the control CPU 113 to control the printer unit 150. Although not illustrated, control of image reading is also achieved by transmitting the content of control to the reading control unit of the image reading apparatus 500 via the printer control unit 151.

A DRAM control IC 161 of the image processing unit (print & scanner controller) 160 is connected to the PCI bus 112.

The image processing unit (print & scanner controller) 160 receives image data or the like by the image forming apparatus 1 from an external apparatus (PC) 2 connected to a network 3 or transmits image data acquired by a scanner unit to the external apparatus (PC) 2 connected to the network 3 when using the image forming apparatus as a network printer or a network scanner.

The image processing unit (print & scanner controller) 160 receives and processes image data input from the external apparatus (PC) 2 via the network 3, and allows for transfer of the image data to the external apparatus (PC) 2 or the like via the network 3.

In the image processing unit (print & scanner controller) 160, an image memory (DRAM) 162 is connected to the DRAM control IC 161. In the image processing unit (print & scanner controller) 160, a controller control CPU 163 and a LAN interface 165 are connected to a common bus. The LAN interface 165 is connected to the network 3. The image memory (DRAM) 162 includes DRAM or the like. The controller control CPU 163 controls the DRAM control IC 161 and the image processing unit (print & scanner controller) 160 as a whole.

The external apparatus (PC) 2 includes an external control unit 20 configured to control the external apparatuses as a whole, and a display unit 21 configured to display information. The external control unit 20, for example, includes a memory such as a CPU, a ROM, and a RAM, and programs operated by the CPU to control the external apparatus (PC) 2. Using the external apparatus (PC) 2 as a management apparatus for managing the operation of the image forming apparatus 1 is also applicable. In this case, the external control unit 20 corresponds to a management controller of the present invention and controls at least the image reading apparatus. In addition, the external control unit 20 controlling the image forming unit 15 is also applicable.

The external apparatus (PC) 2 operating as a management apparatus configured to acquire information from the image forming apparatus 1 for control is also applicable. When the external apparatus (PC) 2 is used as the management apparatus, the external control unit 20 corresponds to the management controller. The display unit 21 including both the operating unit and the display is also applicable.

In the management apparatus, the result of reading of the image is acquired from the image forming apparatus or the image reading apparatus.

The management control unit determining whether the result of reading of the image includes defective or not and calculating a profile shape based on the result of reading of the image is also applicable. The hardware of the management control unit performing these processes corresponds to the computer in which the programs of the present invention are executed.

When the management control unit controls the image forming unit, printing of information, which indicates rough guides of positions in the roll paper, on the roll paper in a job for determining defect of the image is also applicable. The management control unit which transmits a control command to the image forming apparatus to cause the image forming apparatus to perform control, or the management control unit which controls the image forming apparatus directly is applicable.

When the management control unit determines the presence of waste paper, notification can be given by the external apparatus (PC) 2, via transmission to the image forming apparatus, and via transmission to other apparatus. The image forming apparatus that has received the notification is capable of executing the notification by display or printing.

As a basic operation of the image forming apparatus 1, an operation for acquiring image data and forming images on paper will be described.

The image data for forming images is received for example from the external apparatus (PC) 2. The image data transmitted from the external apparatus (PC) 2 through the network 3 is stored in the image memory 162 by the DRAM control IC 161 via the LAN interface 165. The data in the image memory 162 is stored once in the page memory 122 via the DRAM control IC 161, the PCI bus 112, and the DRAM control IC 111. The data stored in the page memory 122 is sent to the compression IC 118 via the DRAM control IC 111 in sequence and is compressed, and then is stored in the compression memory 121 via the DRAM control IC 111, and is managed by the control CPU 113.

When forming images on paper, the image data stored in the compression memory 121 is sent to the expansion IC 125 by the control of the DRAM control IC 111 based on the control of the control CPU 113. The image data is then expanded in the expansion IC 125, and the expanded image data is stored once in the page memory 122. The image data stored in the page memory 122 is transmitted in sequence to the writing processing part 126, and is processed to be data suitable for writing by LD, and the image data after processing is transmitted to the LD. The printer unit 150 including the image forming unit 15 and the conveying route is controlled by the printer control unit 151 which receives a command from the control CPU 113, and then images are formed on the paper.

The roll paper having images formed thereon is conveyed downstream, and the images on the roll paper is read by the image reading unit 510 in the image reading apparatus 500. The image data acquired by reading is transmitted to the control CPU 113, and the control CPU 113 compares the acquired image data and the image data for printing to detect whether there is any defective image on the roll paper or not.

The image forming apparatus 1, in this manner, detects defects of images by comparing the image data read from images on the paper and the image data for printing. The apparatus configured to form images on the continuous paper as that in this embodiment normally stops output of a job, cuts the paper, and removes the corresponding portion of the paper having the defect when detecting any defect.

In contrast, there is a case where the output of the job is not stopped once even when a defect is detected in order to maintain the productivity. However, in such a case, an operation to search the defect portion from the beginning of the roll is required, which means even though defect information is acquired by a defect detecting function, information on the acquired defect is not effectively utilized.

Accordingly, the present embodiment enables printing of the information as rough guides of positions on the roll paper to allow an operator to easily know the position of the defect to continue outputting even when the portion suspicious to be defective is detected to avoid lowering of productivity.

The notification is achieved by displaying on a panel of the operation display unit or printing at an end of the outputted paper. Accordingly, the image forming apparatus configured to continue outputting even when a defect is detected allows the operator to know the position of the defect accurately, so that the number of steps for confirming the quality is reduced.

An operation to print position marks which indicate the positions on the paper will be described.

The information as rough guides of positions such as numbering at positions aligned with the positions of images in the longitudinal direction and the width direction of the paper is used. Numbering of the rough guides of positions only in the longitudinal direction is also applicable.

Figure 4:
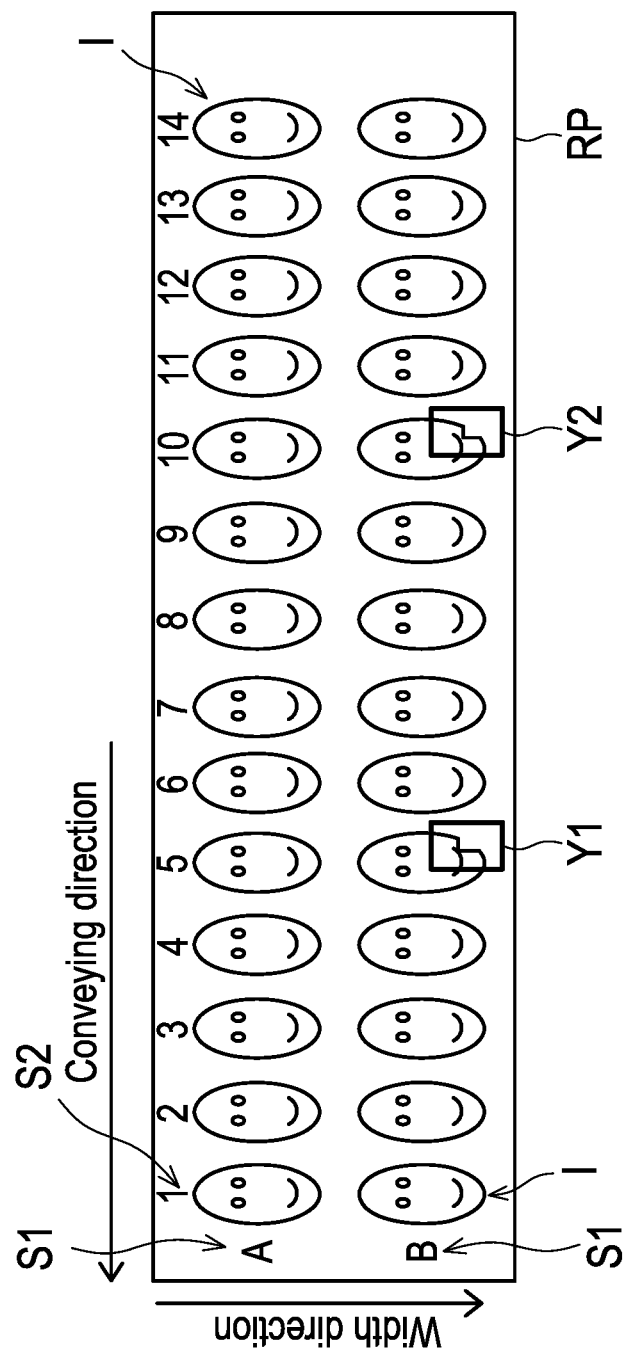
FIG. 4 is a diagram illustrating roll paper having images and position marks formed thereon.

FIG. 4 illustrates an example of printing (stamping) page numbers on the roll paper.

A plurality of images I are formed in the longitudinal direction and the width direction of the roll paper RP. In the width direction, the stamps S1 including A and B are printed to indicate positions with different width in alignment with the positions of the images. The information A of the stamps S1 indicates the position of the images on the right side in the conveying direction, and information B of the stamps S1 indicates the position of the images on the left side in the conveying direction.

In the conveying direction, the stamps S2 including 1, 2, 3 . . . are printed in sequence as the page number.

By printing the stamps S1 and the stamps S2 as the rough guides of positions, the operator is allowed to know easily the positions of the images.

In the example of FIG. 4, defects Y1 and Y2 are detected on the fifth image and on the tenth image in the image column on the left side in the conveying direction, and those images are determined to be defective. This configuration enables notification of abnormality on the image B5 and the image B10 by using the information as rough guides of positions, and the operator is allowed to know the positions of the defective images accurately and easily by referring to the notification.

In an example of FIG. 4, the page numbers are printed as the information as rough guides of positions. However, printing of the information as rough guides of positions based on a distance from a reference position on the roll paper is also applicable.

Figure 5:
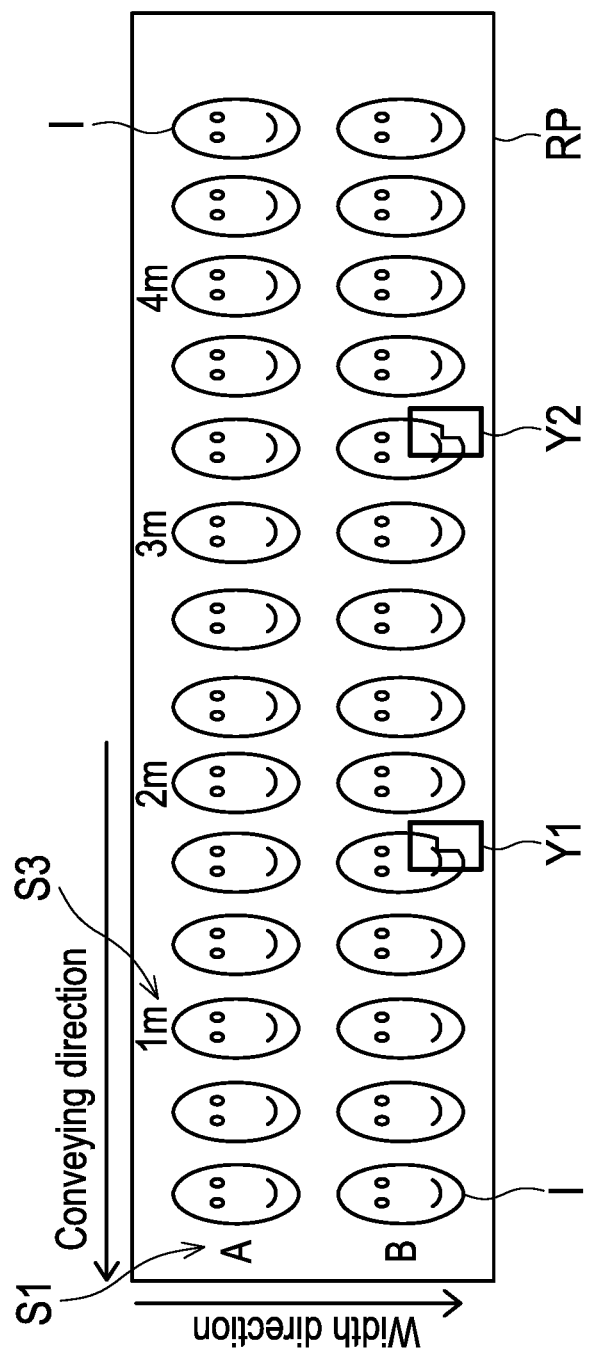
FIG. 5 is a diagram illustrating another example of roll paper having images and position marks formed thereon.

FIG. 5 indicates an example in which the information as rough guides of positions are printed in the form of stamps S3 based on the distance in the conveying direction. In this example, "1 m", "2 m", "3 m" . . . are printed at positions at distances of 1 m, 2 m, 3 m, . . . from a reference position. Selection of the reference position is arbitrary and, for example, a position where the job is started is set as the reference position.

The content of information as rough guides of positions is not limited thereto as long as indication of the rough guides of positions of the images on the paper is enabled. For example, printing of the position marks based on the distance in the direction of the width of the paper is also applicable, or alternatively, a configuration in which the images are divided into blocks, each including a plurality of images, and position marks are allocated to the respective blocks.

The method of notification when any defective image is found includes a method of displaying the position of the defective image on a display or a terminal such as the operation display unit 140 and the display unit 21.

Figure 6:
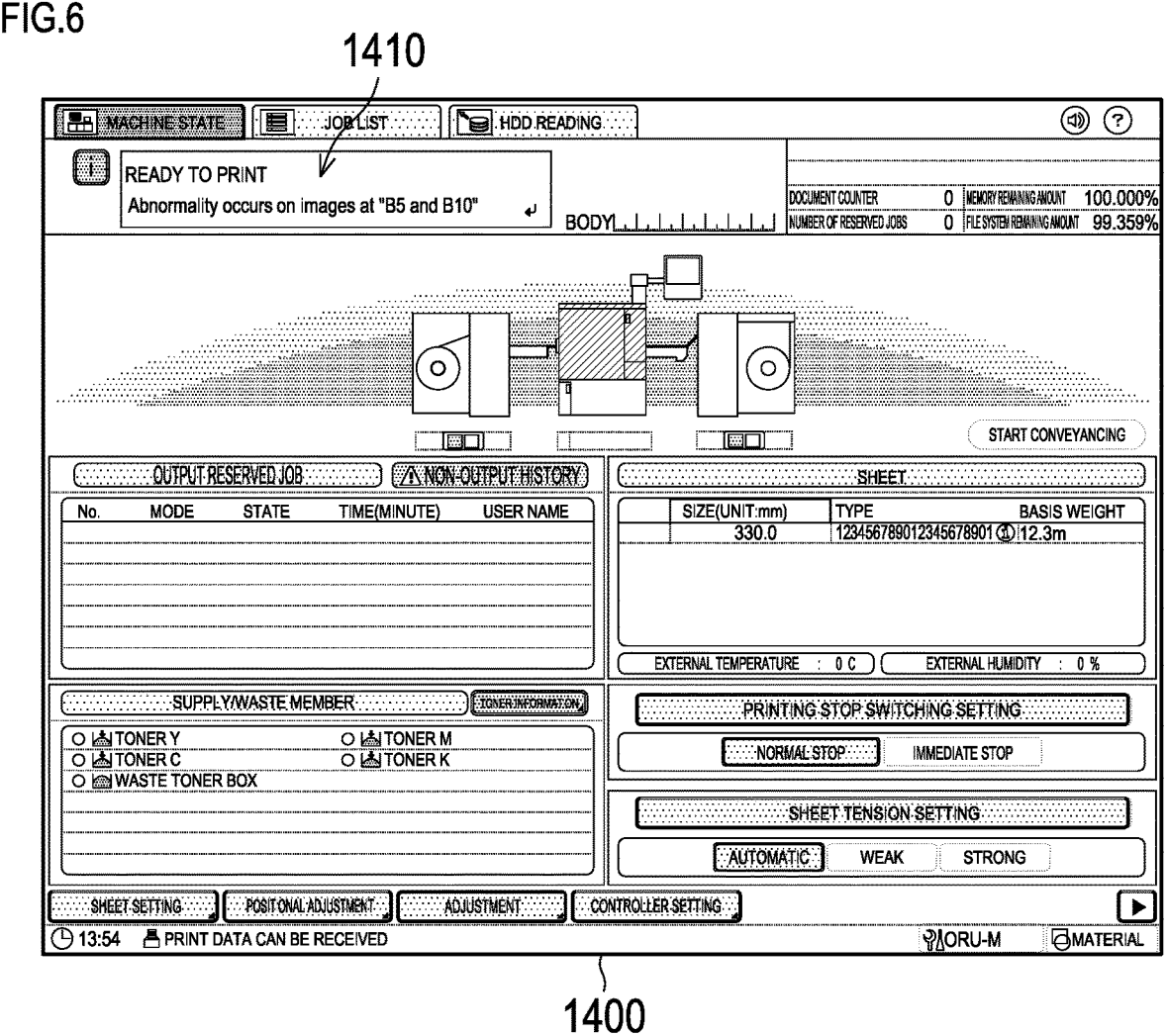
FIG. 6 is a diagram illustrating a notification screen displaying positions of defective images.

FIG. 6 illustrates an example of a case where the positions of the defective images are notified in the display.

In FIG. 6, after the completion of the output of the job, a message saying that "abnormality occurs on images at "B5 and B10" on the message column 1410 of the operation display 1400. Display of the information as rough guides of positions of the defective image by text on the display, the operator is allowed to know the position of the defect image accurately.

In this example, although the notification is performed after the completion of the job, notification during the output of the job is also applicable as timing of notification. For example, the notification at a timing when the defect is detected is also applicable. A configuration that the timing of the notification is selectable by the operator is also applicable. In this case, the operator is allowed to select a timing by an manipulated input via the operation display unit 140 or the like.

As an alternative method of notification, there is a method of printing information as rough guides of positions of the defective images after the completion of output job when the defect of an image is detected.

Figure 7:
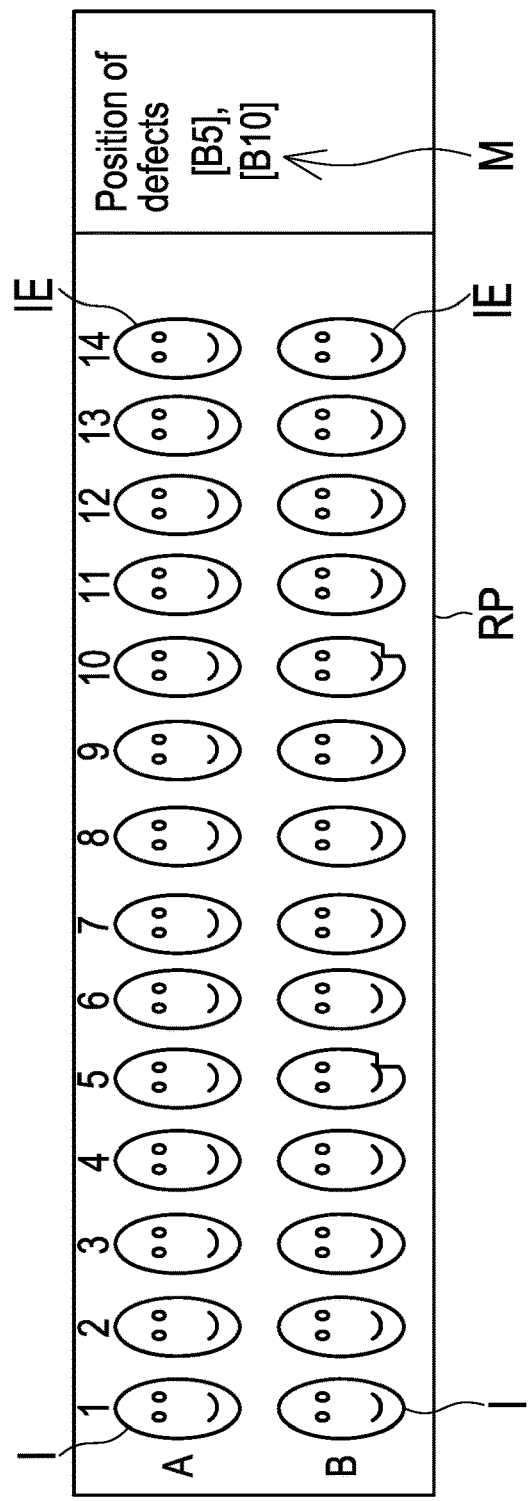
FIG. 7 is a diagram illustrating roll paper having information on positions of defective images printed thereon by text as notification.

FIG. 7 illustrates a case where the information on the positions of the defective images is printed at a position downstream of the last images of the job.

Printing information as rough guides of positions M indicating the positions of defects (defective positions) on the roll paper RP in an area downstream of the last images IE by text allows notification of the information on the positions of the defective images to the operator.

When printing the positions of the defective images, a code including information is also applicable in addition to the text information.

Figure 8:
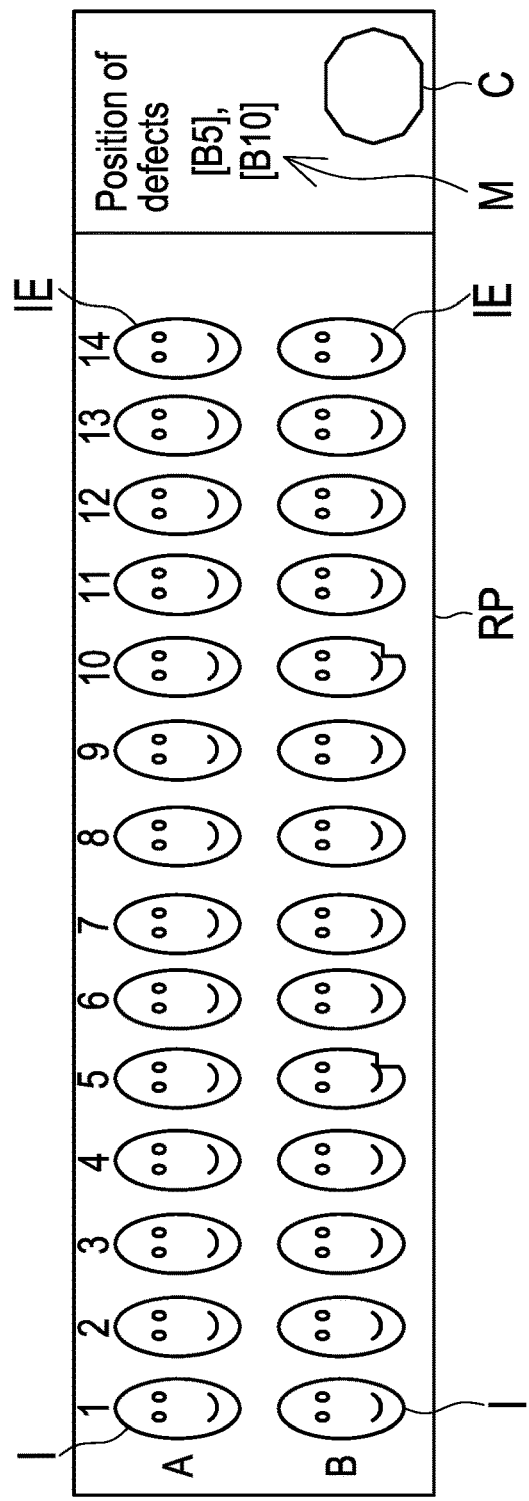
FIG. 8 is a diagram illustrating roll paper having information on positions of defective images printed thereon by text and a code.

In FIG. 8, the information as rough guides of positions M representing the position of the defect (defective position) is printed on the roll paper RP in an area downstream of the last images IE and a code C having information on the positions of the defective images is also printed. In this mode, reading of the code C using a predetermined device or the like achieves acquisition of the information of the positions of defects. Indicating the rough guides of positions only with the code without including the text information is also applicable.

The type of the code C in the present invention is not specifically limited and, for example, the code C includes one-dimensional codes such as bar codes or desired two-dimensional codes.

In the method of notification described above, only information relating to the positions of the images in which a defect is detected. However, a configuration in which the position of the image detected as being defective and positions of images located around the corresponding defective image are notified when causes of such defects are predetermined causes is applicable.

For example, when the cause of the defect is uneven color, such uneven color probably occurs in images around the defective image. Accordingly, the image detected as being defective and images located above, below, on the left and right are notified together as positions of defects. Accordingly, the operator is allowed to confirm the positions of the defective images easily, and is prevented from overlooking the defective image. For example, in the examples illustrated in FIG. 4, FIG. 5 and the like, when uneven color occurs in the image at the position B5, the positions B4, A5, and B6 are also notified as the positions of the defective image in addition to B5. Accordingly, the operator is allowed to check easily.

Figure 9:
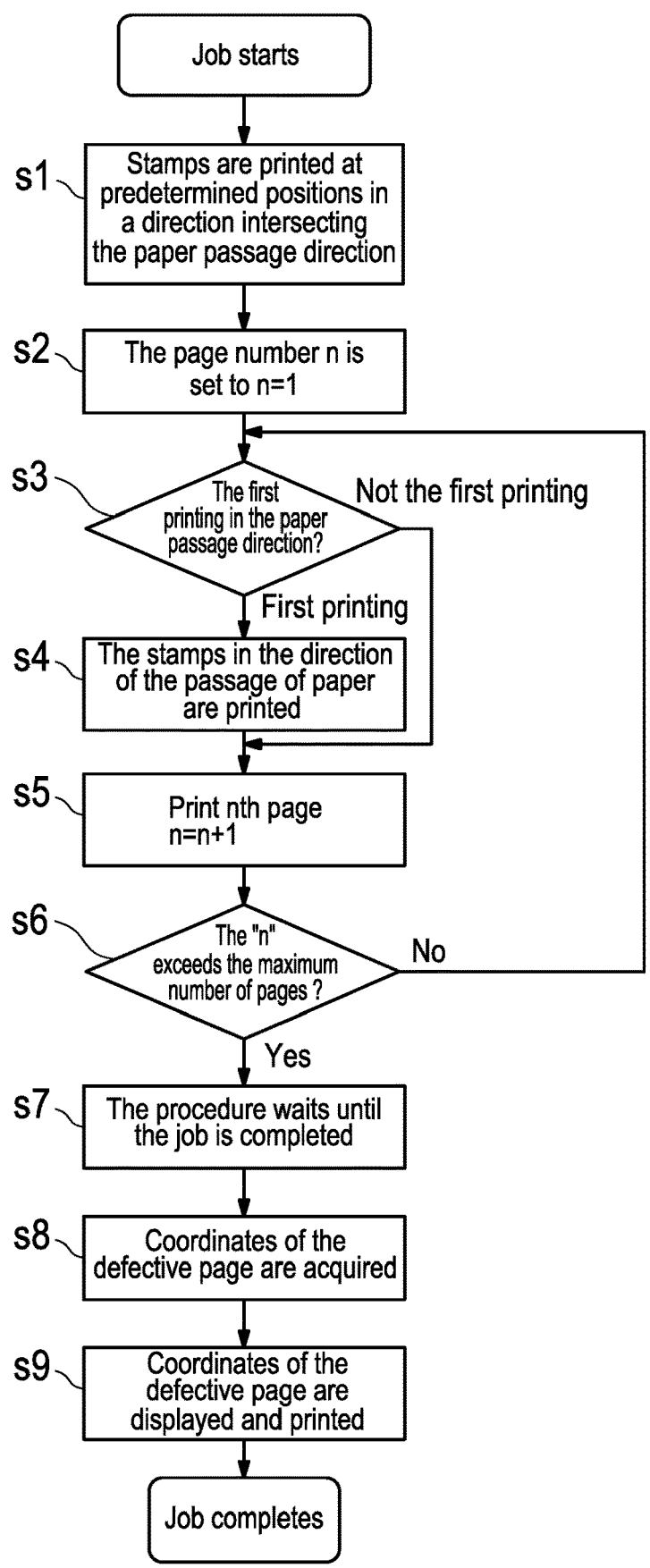
FIG. 9 is a flowchart showing a procedure for printing information as rough guides of positions on continuous paper and a procedure for notifying positions of defective images.

A procedure of the operation for printing the information as rough guides of positions and the operation for notifying the positions of the defective images will be described with reference to a flowchart in FIG. 9. The following procedure is executed by the control unit 100 of the image forming apparatus 1 or the external control unit 20 of the external apparatus (PC) 2.

When the job starts, stamps are printed at predetermined positions in a direction intersecting the paper passage direction (width direction of the paper) (Step s1). Stamps to be printed in Step s1 correspond to the stamps S1 illustrated in FIG. 4. The page number n is set to n=1 (Step s2), and whether the image to be printed is the first printing in the paper passage direction or not is determined (Step s3).

When it is the first printing in the paper passage direction (conveying direction) (Step s3, First Printing), the stamps in the direction of the passage of paper are printed (Step s4), and the procedure goes to Step s5. When it is not the first printing in the paper passage direction (Not the First Printing in Step s3), no stamp is printed in the paper passage direction, and the procedure goes to Step s5. For example, in the case of FIG. 4, when printing an image at the position 'A1', it is the first printing in the paper passage direction. Therefore, "1" is printed as the stamp S2. In contrast, when printing an image at the position "A2", it is not the first printing in the paper passage direction. Therefore, printing of the position mark is not performed.

Next, in Step s5, the page number n is incremented by "1" (Step s5), and whether the "n" exceeds the maximum number of pages (the number of pages to be printed in the job) or not is determined (Step s6). When the "n" does not exceed the maximum number of pages (No, in Step s6), the procedure goes back to Step s3, where printing of images is continued. When the "n" exceeds the maximum number of pages (Yes in Step s6), the procedure waits until the job is completed (Step s7). During this period, reading and determination of the quality of the images formed on the roll paper are performed.

Next, coordinates in the defective page determined to be defective by the determination of the quality of the images are acquired (Step s8), and the coordinates of the defective page are displayed and printed (Step s9) to terminate the job. Although both of the display of the coordinates and printing of the defective page are performed in the Step s9, performing only one of those is also possible.

Figure 10:
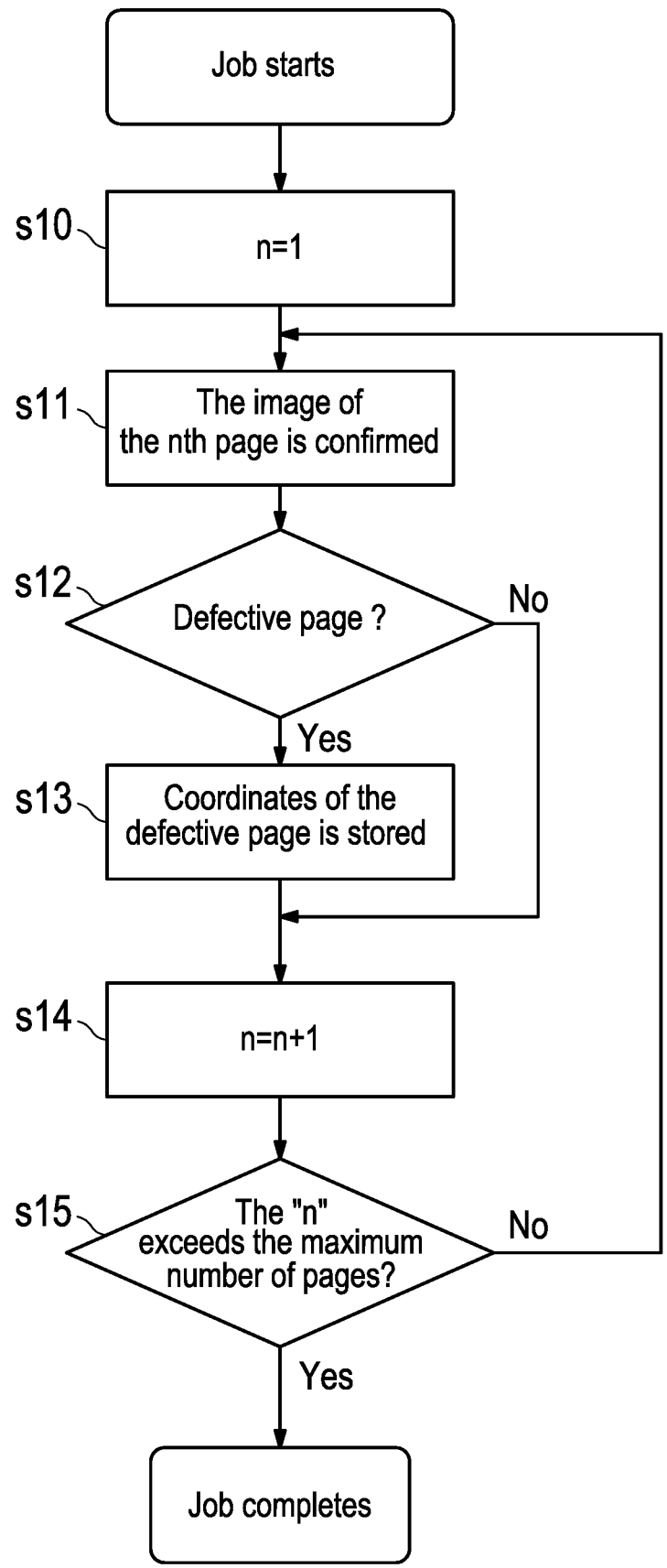
FIG. 10 is a flowchart indicating a procedure for acquiring coordinates of a defective page.

A procedure of acquiring the coordinates of the defect (the defective position) at the time of determination of the quality of the images will be described referring to a flowchart in FIG. 10. The following procedure is executed by the control unit 100 of the image forming apparatus 1 or the external control unit 20 of the external apparatus (PC) 2.

When the job is started, the page number n is set to n=1 (Step s10), and data of the image read from an image on the $n^{th}$ page and image data for printing are compared to confirm the image (Step s11), and whether the image on the $n^{th}$ page is defective or not is determined (Step s12). The position of the image in an $n^{th}$ page on the continuous paper may be acquired from a timing of start of image formation, page assignment setting at the time of printing, a layout of the image data for printing, and the like.

Note that determination of defect is achieved by a known method such as pattern matching. When an image is determined to correspond to a defective page (Yes in Step s12), the coordinates of the defective page is stored (Step s13), and the page number n is incremented by 1 (Step s14). The coordinates of the defective page is stored, for example, in memory such as a ROM, a RAM, not illustrated, and the non-volatile memory 115. When the image is determined not to be defective (No, in Step s12), acquisition of the coordinates of the defective page is not performed, and the page number n is incremented by 1 (Step s14). Next, whether the n exceeds the maximum number of pages (the number of pages to be printed) or not is determined (Step s15), and when the n does not exceed the maximum number of pages (No in Step s15), the procedure goes back to Step s11 and the image of the n$^{th}$ page is confirmed. When then exceeds the maximum number of pages (Yes in Step s15), the job is completed.

According to the embodiment, if the image is determined to be defective when determining the quality of the images formed on the continuous transfer medium, the operator is allowed to know the position of the defective image easily.

Although the present invention has been described with reference to the embodiment described above, the scope of the present invention is not limited to the description given thus far, and various modifications to the embodiment are possible without departing the scope of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
   an image forming unit configured to form an image on a continuous medium based on a job;
   a controller configured to control the image forming unit, the controller having a function to cause the image forming unit to print information indicating a position mark which represents a position at least in a longitudinal direction of the continuous medium on the continuous medium and a function to acquire a result of reading of an image on the continuous medium and determine a quality of the image on the continuous medium based on the result of reading, wherein
   when an image is determined to be defective on the medium having the position mark printed thereon, information on the position mark of the image determined to be defective is notified, and wherein
   the controller determines the quality of the image on a real time basis during output of job, and when the image is detected to be defective, output of job is continued without stopping.

2. The image forming apparatus according to claim 1, wherein when the quality of the image formed based on a job is determined, the controller prints information indicating the position mark on the continuous medium together with an image based on execution of the job.

3. The image forming apparatus according to claim 1, wherein the controller prints the information indicating the position mark in a blank portion on the medium.

4. The image forming apparatus according to claim 1, wherein the position mark includes a page number.

5. The image forming apparatus according to claim 1, wherein the position mark includes a distance on the continuous medium.

6. The image forming apparatus according to claim 1, wherein the position mark includes a position mark in a width direction.

7. The image forming apparatus according to claim 1, wherein the controller indicates the notification by text or a code.

8. The image forming apparatus according to claim 1, further comprising a display configured to display the information, wherein the controller performs the notification by displaying on the display.

9. The image forming apparatus according to claim 1, wherein the controller performs the notification by printing the notification on the continuous medium having the image formed thereon.

10. The image forming apparatus according to claim 1, wherein the controller prints the notification on the continuous medium on a downstream side in a conveying direction of the image after completion of a printing job.

11. The image forming apparatus according to claim 1, wherein the controller transmits the notification to outside.

12. The image forming apparatus according to claim 1, wherein the controller performs the notification during the job or after the job.

13. The image forming apparatus according to claim 1, further comprising an image reader positioned on a downstream side of the image forming unit in a conveying direction and configured to read the image on the continuous medium.

14. An image forming system comprising:
    an image forming unit configured to form an image on a continuous medium based on a job;
    an image reader positioned on a downstream side of the image forming unit in a conveying direction and configured to read the image on the continuous medium; and
    a controller configured to control the image forming unit and the image reader, the controller having a function to cause the image forming unit to print information indicating a position mark which represents a position at least in a longitudinal direction of the continuous medium and a function to acquire a result of reading of an image on the continuous medium and determining a quality of the image on the continuous medium based on the result of reading, wherein
    when an image is determined to be defective on the medium having the position mark printed thereon, information on the position mark of the image determined to be defective is notified, and wherein
    the controller determines the quality of the imam on a real time basis during output of job, and when the imam is detected to be defective, output of job is continued without stopping.

15. A management apparatus configured to manage an image reader configured to read an image on a continuous medium, comprising:
    a management controller configured to control the image reader, the management controller having a function to acquire a result of reading of the image on the continuous medium and determine a quality of the image on the continuous medium based on the result of reading, wherein
    when an image is determined to be defective on the medium having a position mark printed thereon, information on the mark indicating the position of the image determined to be defective is notified, and wherein
    the management controller determines the quality of the imam on a real time basis during output of job, and when the imam is detected to be defective, output of job is continued without stopping.

16. The management apparatus according to claim 15, wherein the management controller further controls an image forming unit configured to form an image on the continuous medium based on a job, and further includes a function to cause the image forming unit to print information indicating the position mark which represents a position at least in a longitudinal direction of the continuous medium on the continuous medium.

17. A non-transitory computer readable recording medium storing a program to be executed by a computer configured to control an image forming unit configured to form an image on a continuous medium and an image reader configured to read the image on the continuous medium, the program causes the computer to execute issuing a command to print information indicating a position mark which represents a position at least in a longitudinal direction of the continuous medium on the continuous medium by the image forming unit, acquiring a result of reading of the image read by the image reader to determine a quality of the image, and when image is determined to be defective when the quality of the image is determined, notifying the information on a mark indicating a position of the image determined to be defective, wherein the quality of the image is determined on a real time basis during output of job, and when the image is detected to be defective, output of job is continued without stopping.

18. A non-transitory computer readable recording medium storing a program to be executed by a computer configured to control an image reader configured to read an image on a continuous medium, the program causes the computer to execute acquiring a result of reading of the image read by the image reader to determine a quality of the image, and when image is determined to be defective when the quality of the image is determined, notifying information on a mark indicating a position of the image determined to be defective, wherein the quality of the image is determined on a real time basis during output of job, and when the image is detected to be defective, output of job is continued without stopping.

19. The non-transitory computer readable recording medium according to claim 18, wherein the computer further controls an image forming unit configured to form an image on the continuous medium, and further causes the image forming unit to issue a command to print information indicating a position mark which represents a position at least in a longitudinal direction of the continuous medium on the continuous medium.

\* \* \* \* \*